United States Patent
Mian et al.

(10) Patent No.: US 6,985,322 B2
(45) Date of Patent: Jan. 10, 2006

(54) PERPENDICULAR RECORDING AND READ HEAD ASSEMBLY WITH IN SITU STAND ALONE STABILIZER FOR A MAGNETIC MEDIUM UNDERLAYER

(75) Inventors: Guo Mian, Fremont, CA (US); Gary Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 76 days.

(21) Appl. No.: 10/631,337

(22) Filed: Jul. 30, 2003

(65) Prior Publication Data

US 2005/0024760 A1     Feb. 3, 2005

(51) Int. Cl.
*G11B 5/02*     (2006.01)
(52) U.S. Cl. .......................................... 360/57; 360/313
(58) Field of Classification Search ................ 360/57, 360/313, 317, 327, 324.1, 324.2, 125, 121, 360/123
See application file for complete search history.

(56) References Cited

U.S. PATENT DOCUMENTS

| | | | | |
|---|---|---|---|---|
| 5,900,728 A | * | 5/1999 | Moser et al. | 324/244 |
| 6,025,977 A | * | 2/2000 | Hu et al. | 360/319 |
| 6,667,848 B1 | * | 12/2003 | Khizroev et al. | 360/125 |
| 2002/0075586 A1 | * | 6/2002 | Dimitrov et al. | 360/57 |
| 2002/0145832 A1 | * | 10/2002 | Seigler et al. | 360/313 |
| 2003/0137779 A1 | * | 7/2003 | Santini et al. | 360/317 |

\* cited by examiner

*Primary Examiner*—David Hudspeth
*Assistant Examiner*—Dismery Mercedes
(74) *Attorney, Agent, or Firm*—Ervin Johnston; Rambod Nader

(57) ABSTRACT

A data storage apparatus includes a magnetic medium having a top recording layer of hard magnetic material for perpendicularly storing magnetic data and a bottom underlayer of soft magnetic material, a read head for reading magnetic data from a recorded portion of the recording layer, a stabilizer for magnetically stabilizing a portion of the underlayer directly below the recorded portion simultaneously while the read head is reading magnetic data from the recorded portion and the read head and the stabilizer being separate structures.

38 Claims, 4 Drawing Sheets

PERPENDICULAR RECORDING AND READ HEAD ASSEMBLY WITH IN SITU STAND ALONE STABILIZER FOR A MAGNETIC MEDIUM UNDERLAYER

BACKGROUND OF THE INVENTION

1. Field of the Invention

The present invention relates to perpendicular recording and read head assembly with in situ stand alone stabilizer for a magnetic medium underlayer and, more particularly, to such a stabilizer which stabilizes the magnetic medium underlayer below the read head without impacting the operation of the read head.

2. Description of the Related Art

The heart of a computer is a magnetic disk drive which includes a rotating magnetic disk, a slider that has write and read heads, a suspension arm and an actuator arm. When the disk is not rotating the actuator arm parks the suspension arm on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. When the slider rides on the air bearing the actuator arm positions the write and read heads over selected circular tracks on the rotating disk where field signals are written and read by the write and read heads. The write and read heads are connected to processing circuitry that operates according to a computer program to implement the writing and reading functions.

A write head is typically rated by its areal density which is a product of its linear bit density and its track width density. The linear bit density is the number of bits which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the length of the bit along the track and the track width density is dependent upon the width of the second pole tip at the ABS. Efforts over the years to increase the areal density have resulted in computer storage capacities increasing from kilobytes to megabytes to gigabytes.

The magnetic moment of each pole piece of a write head is parallel to the ABS and to the major planes of the layers of the write head. When the write current is applied to a coil of the write head the magnetic moment rotates toward or away from the ABS, depending upon whether the write signal is positive or negative. When the magnetic moment is rotated from the parallel position, magnetic flux fringing between the pole pieces writes a positive or a negative bit in the track of the rotating magnetic disk. As the write current frequency is increased, the linear bit density is also increased. An increase in the linear bit density is desirable in order to increase the aforementioned areal density which increase results in increased storage capacity.

There are two types of magnetic write heads. One type is a longitudinal recording write head and the other type is a perpendicular recording write head. In the longitudinal recording write head the flux induced into first and second pole pieces by the write coil fringes across a write gap layer, between the pole pieces, and into the circular track of the rotating magnetic disk. This causes an orientation of the magnetization in the circular disk to be parallel to the plane of the disk which is referred to as longitudinal recording. The volume of the magnetization in the disk is referred to as a bit cell and the magnetizations in various bit cells are antiparallel so as to record information in digital form. The bit cell has a width representing track width, a length representing linear density and a depth which provides the volume necessary to provide sufficient magnetization to be read by a sensor of the read head. In longitudinal recording magnetic disks this depth is somewhat shallow. The length of the bit cell along the circular track of the disk is determined by the write flux frequency, write field gradiant, linear velocity of the track and the demagnetization field from the media. In longitudinal recording, the bit cell is lying along the circular track direction. The written transition (flux reversal) is in the same direction. However, the demagnetization field from the magnetic charge at the transition is in the opposite direction to the magnetization in the recorded bit. When the bit cell length becomes shorter and shorter, the demagnetization field will increase. Eventually, when the field strength is nearing Hc of the media, it will demagnetize the written transition by itself. It is this demagnetization effect that limits the minimum bit cell length achievable by the longitudinal recording scheme. In order to reduce the demagnetization field, the recording media layer thickness has to be reduced if the media remanent saturation magnetization remains the same, which results in smaller bit cell volume and weaker signal level during readback process.

In perpendicular recording, since the magnetization of the recorded bit cell is vertical to the surface, the demagnetization field generated by the neighboring bits is in the same direction as the magnetization direction of the current bit, which helps to stabilize the recorded transition. Therefore, one can write very narrow bit cell length along the circular direction without suffering from the demagnetization effect in the longitudinal recording case. As a result, perpendicular recording is expected to be able to achieve much higher recording bit density compared to longitudinal recording. Also, for the same reason, thicker media can be used to increase the signal level during readback, which reduces the amplitude requirement from the read sensor.

Since most perpendicular write heads use a single pole for writing, a high permeable soft underlayer is needed to provide a flux return path to increase the write field gradient and to improve the sharpness of the written transitions. After the recording layer of the rotating disk has been recorded by the write head the disk passes under the read head where the read head reads the recorded signal which is in a portion of the recorded layer directly below the read head. Unfortunately, a soft underlayer portion directly below the recorded layer portion typically introduces noise into the reading process which seriously degrades the error rate performance of the head assembly. The noise is due to the fact that the underlayer portion is in a multiple magnetic domain state and the domain walls move with the slightest provocation. Domain walls and domain wall movement induce magnetic flux changes in the read sensor during disk rotation. This introduces unwanted magnetic signals into the read head which causes degradation of signal to noise ratio (SNR) to recording channels.

A constant bias field has been proposed for maintaining the underlayer in a single domain state. In one proposal a bias field is introduced into the soft underlayer at a remote location from the read head during rotation of the magnetic disk. Unfortunately, by the time the underlayer portion reaches the read head the underlayer portion may have returned to a multiple domain state. Another approach is to employ components of the read head for stabilizing the soft underlayer. This approach will pose reliability issues such as sensor non-linearity, sensor stability, amplitude thermal decay and electron migration.

SUMMARY OF THE INVENTION

The present invention provides a perpendicular recording and read head assembly with a stand-alone stabilizer, which is separate from a read head portion of the assembly, for stabilizing a portion of the soft underlayer directly below a portion of the recorded layer which is being read by the read head. Simultaneously, with the read head reading a recorded portion of the top recorded layer the stabilizer, which is separate from and magnetically non-coupled to the read head, introduces a field into a portion of the bottom underlayer, which is directly below the recorded portion, with sufficient strength to stabilize the portion of the bottom underlayer in a single domain state. The stabilizer may include first and second elongated probes and a bridge wherein the bridge interconnects the first and second probes. The read head is located between the first and second probes. In one embodiment the write head is also located between the first and second probes and in another embodiment one of the first and second pole pieces of the write head is a common component with one of the first and second probes. In another embodiment of the invention the probe that is closest to the read head is recessed from a head surface plane so as to improve magnetic performance.

Other aspects of the invention will be appreciated upon reading the following description taken together with the accompanying drawings wherein the various figures are not to scale with respect to one another nor are they to scale with respect to the structure depicted therein.

DESCRIPTION OF THE PREFERRED EMBODIMENTS

Magnetic Disk Drive

Figure 1:
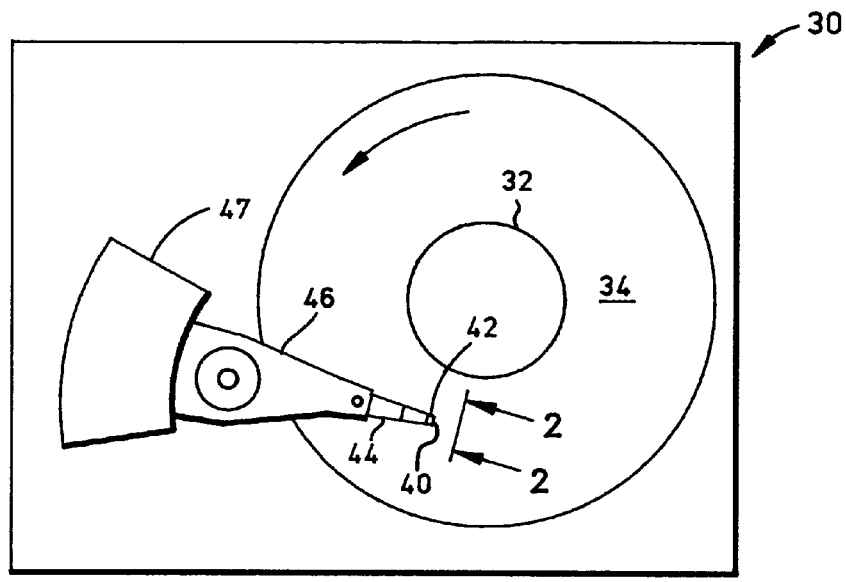
FIG. 1 is a plan view of an exemplary prior art magnetic disk drive.
Figure 2:
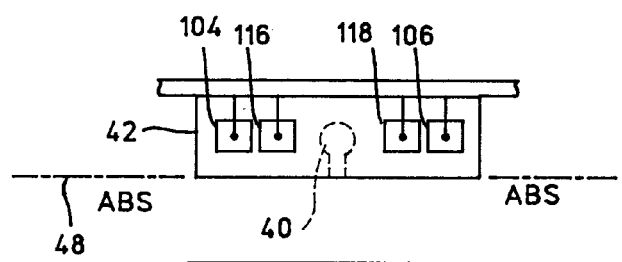
FIG. 2 is an end view of a prior art slider with a magnetic head of the disk drive as seen in plane 2—2 of FIG. 1.
Figure 3:
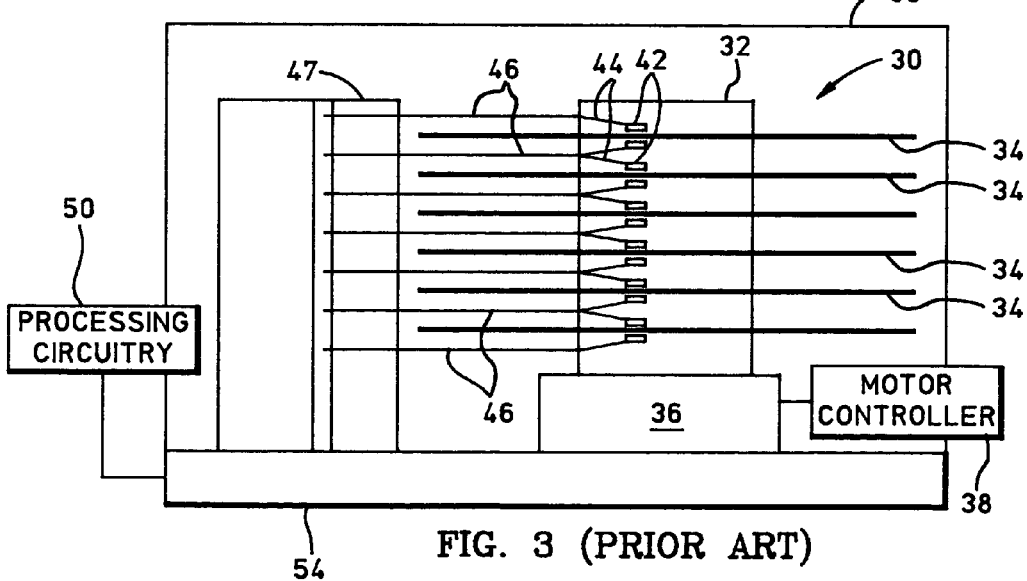
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
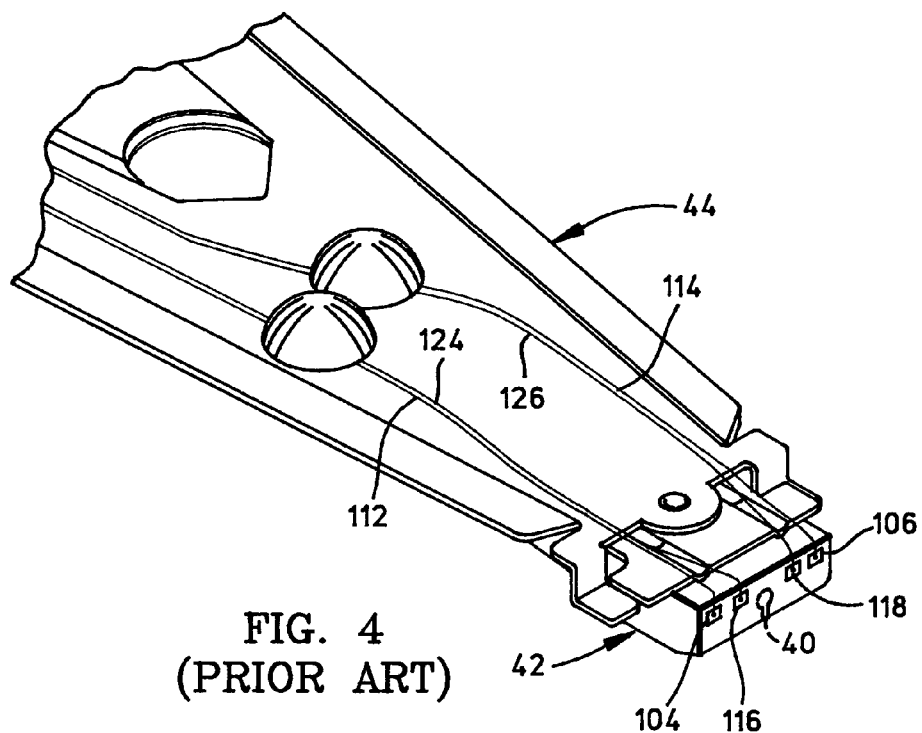
FIG. 4 is an isometric illustration of an exemplary prior art suspension system for supporting the slider and magnetic head.

When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
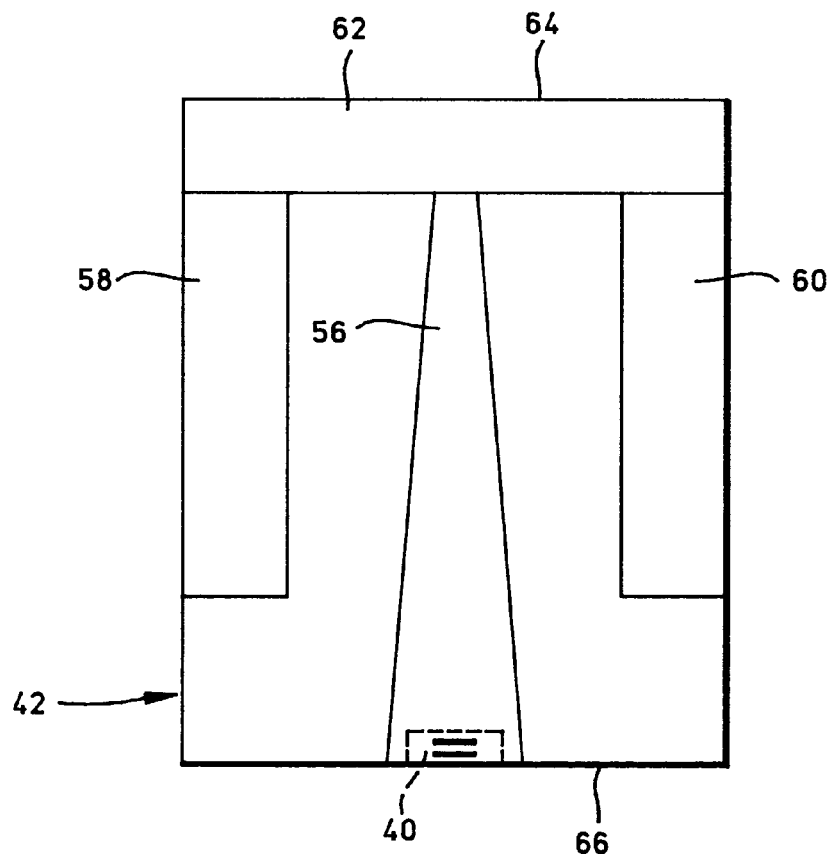
FIG. 5 is an ABS view of the magnetic head taken along plane 5—5 of FIG. 2.

FIG. 5 is an exemplary ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
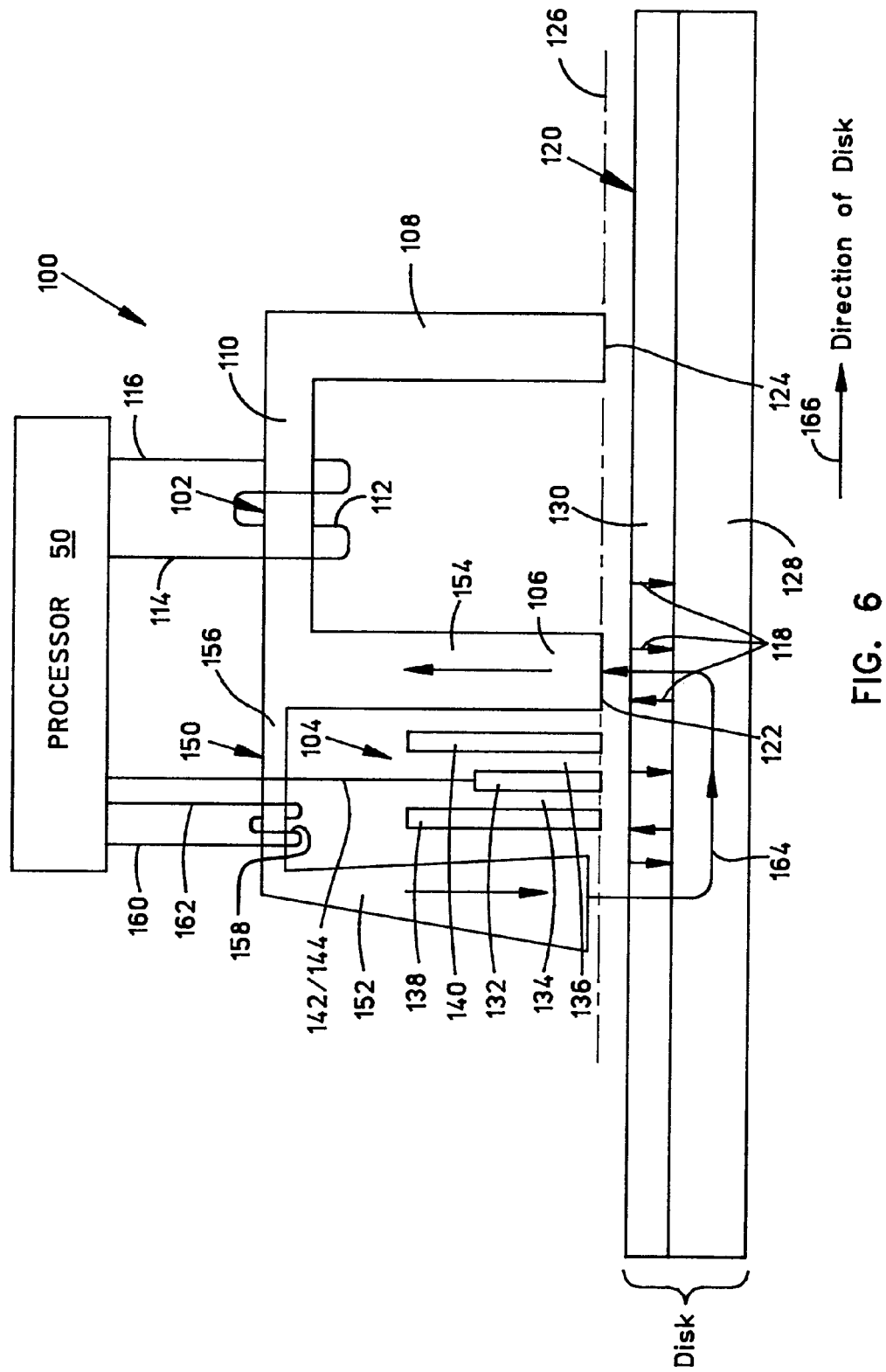
FIG. 6 is a schematic illustration of a first embodiment of the present magnetic head assembly adjacent a moving magnetic medium such as a rotating magnetic disk.

FIG. 6 illustrates a first embodiment of the present perpendicular recording magnetic head assembly 100 which has a write head portion which is generally shown at 102 and a read head portion which is generally shown at 104. The write head portion 102 includes spaced apart first and second ferromagnetic pole pieces 106 and 108 which are magnetically connected by a ferromagnetic back gap 110. The pole pieces 106 and 108 are energized by a coil 112 about the back gap 110. It should be understood that the coil 112 is a schematic illustration for a pancake type of spiral coil which spirals about the back gap 110 and is more fully described and illustrated in U.S. Pat. No. 6,134,080, which is incorporated by reference herein. Leads 114 and 116 connect the coil 112 to the processor 50 so that the processor 50 can send appropriate currents through the coil to energize the pole pieces 106 and 108 for perpendicularly recording magnetic bits 118 in a rotating perpendicular recording disk 120. The pole pieces 106 and 108 have head surface portions 122 and 124 respectively which lie in a head surface plane 126. The head surfaces 122 and 124 are slightly spaced from the recording disk 120 due to an air bearing created by the movement of the disk past the head surfaces 122 and 124. The recording disk 120 has a soft magnetic underlayer 128 which is immediately below a top recording layer 130. The recording layer 130 has a high coercivity ($H_C$), such as 3000 Oe, while the soft underlayer 128 has a low coercivity ($H_C$), such as 30 Oe. The recorded magnetic bits 118 are recorded into the recording layer 130 by one of the pole pieces 106 and 108 which introduces flux into the recording layer 130, thence along the soft underlayer 128, thence toward and then into the other pole piece to complete the magnetic circuit. The direction of this flux flow determines the direction of the bits 118 in the recorded layer which, in turn, represents ones and zeroes of the digitally recorded data.

The read head 104 includes a sensor 132, such as a GMR sensor, which is located between non-magnetic first and second read gap layers 134 and 136 which are, in turn, located between ferromagnetic first and second shield layers 138 and 140. First and second leads 142 and 144 are connected to opposite edges (not shown) of the sensor 132 for conducting a sense current through the sensor. Both of the leads 142 and 144 are connected to the processor 50 where the sense current is generated. The sensor 132, the first and second read gap layers 134 and 136 and the first and second shield layers 138 and 140 have edge surfaces which are located at the ABS side and form a portion of the head surface 126 of the assembly. Accordingly, these head surfaces are supported on an air bearing slightly distanced from the top surface of the recording layer 130 while the magnetic disk 120 is rotated. When the read sensor is activated it senses the polarity of the bits 118 in the recording layer by a change in the resistance of the sensor 132, which resistance causes a change in potential in the sense current circuit which is processed as playback signals by the processor 50.

Generally shown at 150 is a stabilizer for saturating the soft underlayer 128 in a single domain state directly below the portion of the recording layer 130 that is being read by the read head 104. This prevents the soft underlayer 128 from creating noise since there is no domain wall movement relative to the read sensor when the underlayer 128 is in a single domain state. Accordingly, the read head 104 will only sense the magnetic bits 118 and will not be degraded by noise generated by the soft underlayer 128 directly therebelow.

The stabilizer 150 is a yoke type assembly with first and second probes 152 and 154 with a bridge 156 interconnecting the probes. The stabilizer 150 is energized by a winding 158 about the bridge 156 which has first and second leads 160 and 162 which are connected to the processor 50. At appropriate times the processor conducts a DC current through the winding 158 via leads 160 and 162 which causes the stabilizer 150 to conduct a constant bias field through the portion of the soft underlayer 128 directly below the read head 104. This is shown schematically in FIG. 6 wherein flux is conducted by the probe 152 through the recording layer 130 into the soft underlayer 128 where the flux 164 biases the underlayer portion directly below the read head 104 into a single domain state, after which it returns to the probe 154. Depending upon the direction of the current through the leads 160 and 162 the direction of the flux may be opposite to that shown schematically in FIG. 6.

In the embodiment in FIG. 6 the first pole piece layer 106 and the second probe 154 are a common component. In regard to the read head 104, however, the stabilizer 150 is a separate structure which reduces any magnetic coupling therebetween. Since each of the read head 104 and the stabilizer 150 is a stand-alone structure, simultaneous operation of the stabilizer 150 and the read head 104 will not affect the operation of the read head. An aspect of the invention is that the processor 50 causes the read head 104 and the stabilizer 150 to operate simultaneously. The operation of the stabilizer 150 may be off during the operation of the write head 102, however, in a broad aspect of the invention it should be understood that the stabilizer may be left on continuously even during the operation of the write head 102.

The soft underlayer 128 has a low coercivity which is significantly less than the coercivity of the recording layer 130. Accordingly, the flux 164 will not affect the orientation of the bits 118 when it is conducted through the recorded layer and will still be sufficient to stabilize the soft underlayer 128. It is sufficient if the bias field of the stabilizer 150 is approximately twice the coercivity of the material of the soft underlayer 128. The length of the saturated portion of the soft underlayer below the read head 104 may be in the range of 6–8 PW50 or larger so that the read back signal will be more linear for digital sequence recording such as partial response maximum likelihood (PRML). The coercivity of the recording layer 130 is well above 2000 Oe.

Another aspect of the invention is to recess the edge of the probe 152 which is not a common component with the first pole piece layer 106 from the head surface so as to reduce the field strength in the read process and possible secondary writing during the writing of the signals on the magnetic disk by the write head 102. Further, another aspect of the invention is to narrow the probe 152 in its upper extremity away from the head surface and widen it as it progresses toward the head surface so that the probe 152 can be essentially saturated at its upper end with the diluting of flux at its lower end minimized. Since the weak bias field is basically perpendicular to the magnetization of the read sensor it will have a very small impact on the read sensor. The direction of the magnetic disk 120 below the read and write heads 104 and 102 are shown by the arrow 166.

Figure 7:
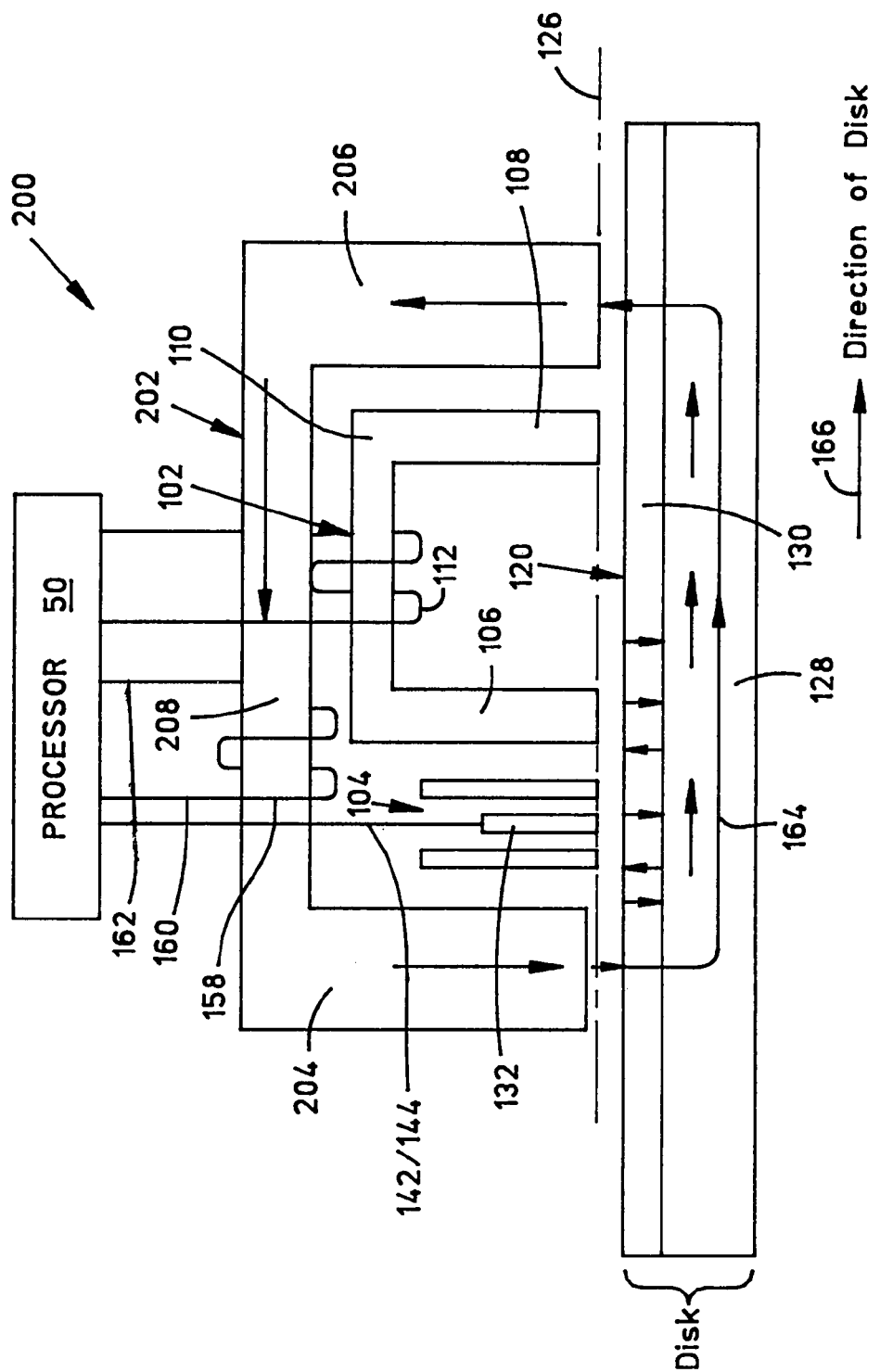
FIG. 7 is a second embodiment of the present magnetic head assembly adjacent a rotating magnetic disk.

FIG. 7 illustrates another embodiment of the read and write head assembly 200 which is the same as the assembly 100 in FIG. 6 except the stabilizer 202 is not only a separate structure from the read head 104 but is also a separate structure from the write head 102. The stabilizer 202 is also a yoke assembly which has first and second probes 204 and 206 which are interconnected by a bridge 208. The coil 158 still energizes the stabilizer 202 and the coil 112 still energizes the write head 102. In this embodiment the stabilizing flux 164 follows a path below both the write and read heads 102 and 104 with, for instance, the first probe 204 conducting the flux through the recording layer into the soft underlayer 128 after which it travels back through the recording layer into the second probe 206. The bottom edge of the probe 204 closest to the read head may be recessed from the head surface as shown in FIG. 7 for minimizing the effect of the flux from the probe 204 on the operation of the read head 104.

Clearly, other embodiments and modifications of this invention will occur readily to those of ordinary skill in the art in view of these teachings. For instance, the magnetic head assembly may be employed in a tape drive instead of a disk drive. Therefore, this invention is to be limited only by the following claims, which include all such embodiments and modifications when viewed in conjunction with the above specification and accompanying drawings.

We claim:

1. A data storage apparatus comprising:
    a read head for reading magnetic data from a recorded portion of a recording layer of a perpendicularly recorded magnetic medium;
    a stabilizer for magnetically stabilizing a portion of an underlayer of the magnetic medium directly below the recorded portion simultaneously while the read head is reading said magnetic data from the recorded portion; and
    the read head and the stabilizer being separate stand-alone structures so that the read head and the stabilizer operate independently.

2. A data storage apparatus as claimed in claim 1 wherein the stabilizer includes:
    first and second elongated probes and a bridge with the bridge interconnecting the first and second probes; and
    the read head being located between the first and second probes.

3. A data storage apparatus as claimed in claim 1 further comprising:
    the read head having a head surface which defines a head surface plane;

the first probe being closer to the read head than the second probe; and the first probe being recessed from the head surface plane and the second probe being coextensive with the head surface plane.

4. A data storage apparatus as claimed in claim 3 wherein the first probe increases in magnetic material volume as it extends toward the head surface.

5. A data storage apparatus as claimed in claim 1 further comprising:

biasing means for applying a constant bias field to the stabilizer.

6. A data storage apparatus as claimed in claim 5 wherein the constant bias field is greater than two (2) times the magnetic coercivity of the soft underlayer.

7. A data storage apparatus as claimed in claim 2 further comprising:

a write head which has first and second pole pieces; and one of the first and second probes and one of the first and second pole pieces being a common component.

8. A data storage apparatus as claimed in claim 7 further comprising:

the read head having a head surface which defines a head surface plane;

the first probe being closer to the read head than the second probe; and the first probe being recessed from the head surface plane and the second probe being coextensive with the head surface plane.

9. A data storage apparatus as claimed in claim 8 wherein the first probe increases in magnetic material volume as it extends toward the head surface.

10. A data storage apparatus as claimed in claim 9 further comprising:

biasing means for applying a constant bias field to the stabilizer.

11. A data storage apparatus as claimed in claim 10 wherein the constant bias field is greater than two (2) times the magnetic coercivity of the soft underlayer.

12. A data storage apparatus as claimed in claim 11 wherein the read head comprises;

nonmagnetic first and second read gap layers;

a sensor located between the first and second read gap layers;

ferromagnetic first and second shield layers; and the first and second read gap layers being located between the first and second shield layers.

13. A data storage apparatus as claimed in claim 2 further comprising:

a write head; and in addition to the read head being located between the first and second probes, the write head also being located between the first and second probes.

14. A data storage apparatus as claimed in claim 13 further comprising:

the read head having a head surface which defines a head surface plane;

the first probe being closer to the read head than the second probe; and the first probe being recessed from the head surface plane and the second probe being coextensive with the head surface plane.

15. A data storage apparatus as claimed in claim 14 wherein the first probe increases in magnetic material volume as it extends toward the head surface.

16. A data storage apparatus as claimed in claim 15 further comprising:

biasing means for applying a constant bias field to the stabilizer.

17. A data storage apparatus as claimed in claim 16 wherein the constant bias field is greater than two (2) times the magnetic coercivity of the soft underlayer.

18. A data storage apparatus as claimed in claim 17 wherein the read head comprises;

nonmagnetic first and second read gap layers;

a sensor located between the first and second read gap layers;

ferromagnetic first and second shield layers; and the first and second read gap layers being located between the first and second shield layers.

19. A method of making a data storage apparatus comprising the steps of:

forming a read head for reading magnetic data from a recorded portion of a recording layer of a perpendicularly recorded magnetic medium;

forming a stabilizer for magnetically stabilizing a portion of an underlayer of the magnetic medium directly below the recorded portion simultaneously while the read head is reading said magnetic data from the recorded portion; and forming the read head and the stabilizer as separate stand alone structures, so that the read head and the stabilizer operate independently.

20. A method as claimed in claim 19 wherein the method further comprises the steps of:

providing the stabilizer with first and second elongated probes and a bridge wherein the bridge interconnects the first and second probes; and locating the read head between the first and second probes.

21. A method as claimed in claim 22 wherein the method further comprises the steps of:

providing the read head having a head surface which defines a head surface plane;

locating the first probe closer to the read head than the second probe; and recessing the first probe from the head surface plane and making the second probe coextensive with the head surface plane.

22. A method as claimed in claim 21 wherein the method further comprises the step of:

applying a constant bias field to the stabilizer.

23. A method as claimed in claim 22 wherein the constant bias field is formed greater than two (2) times the magnetic coercivity of the soft underlayer.

24. A method as claimed in claim 20 wherein the method further comprises the steps of:

providing a write head; and in addition to locating the read head between the first and second probes, also locating the write head between the first and second probes.

25. A method as claimed in claim 24 wherein the method further comprises the steps of:

providing the read head having a head surface which defines a head surface plane;

locating the first probe closer to the read head than the second probe; and recessing the first probe from the head surface plane and making the second probe coextensive with the head surface plane.

26. A method as claimed in claim 25 wherein the method further comprises the step of:

applying a constant bias field to the stabilizer.

27. A method as claimed in claim 26 wherein the constant bias field is formed greater than two (2) times the magnetic coercivity of the soft underlayer.

28. A method of suppressing noise while reading from a perpendicular recorded medium comprising the steps of:
   employing a read head for reading a recorded portion of a top recording layer; and
   simultaneously with said reading, employing a stabilizer, which is a separate and a stand-alone structure from the read head, so that the read and the stabilizer operate independently, for introducing a field into a portion of a bottom underlayer directly below the recorded portion with sufficient strength to stabilize said portion of the bottom underlayer in a single domain state.

29. A data storage apparatus comprising:
   a read head for reading magnetic data from a recorded portion of a recording layer of a perpendicularly recorded magnetic medium;
   the read head including a read sensor and first and second shield layers with the read sensor being located between the first and second shield layers;
   a stabilizer for magnetically stabilizing a portion of an underlayer of the magnetic medium directly below the recorded portion simultaneously while the read head is reading said magnetic data from the recorded portion; and
   the read sensor and the stabilizer being separate structures and magnetically decoupled with respect to one another.

30. A data storage apparatus as claimed in claim 29 wherein the stabilizer includes:
   first and second elongated spaced apart probes and a bridge with the bridge interconnecting the first and second probes;
   means for energizing the bridge so that magnetic flux flows between the space between the probes; and
   the read head being located between the first and second probes.

31. A data storage apparatus as claimed in claim 30 further comprising:
   a write head which has first and second pole pieces; and
   one of the first and second probes and one of the first and second pole pieces being a common component.

32. A data storage apparatus as claimed in claim 30 further comprising:
   a write head; and
   in addition to the read head being located between the first and second probes, the write head also being located between the first and second probes.

33. A data storage apparatus as claimed in claim 32 further comprising:
   the read head having a head surface which defines a head surface plane; and
   the first probe being recessed from the head surface plane and the second probe being coextensive with the head surface plane.

34. A data storage apparatus as claimed in claim 33 wherein the first probe increases in magnetic material volume as it extends toward the head surface.

35. A data storage apparatus as claimed in claim 29 further comprising:
   the read head having a head surface which defines a head surface plane; and
   the first probe being recessed from the head surface plane and the second probe being coextensive with the head surface plane.

36. A data storage apparatus as claimed in claim 35 wherein the first probe increases in magnetic material volume as it extends toward the head surface.

37. A data storage apparatus as claimed in claim 29 further comprising:
   biasing means for applying a constant bias field to the stabilizer.

38. A data storage apparatus as claimed in claim 36 wherein the constant bias field is greater than two (2) times the magnetic coercivity of the soft underlayer.

* * * * *

UNITED STATES PATENT AND TRADEMARK OFFICE
CERTIFICATE OF CORRECTION

PATENT NO. : 6,985,322 B2
DATED : January 10, 2006
INVENTOR(S) : Mian et al.

It is certified that error appears in the above-identified patent and that said Letters Patent is hereby corrected as shown below:

Column 10,
Line 36, change "36" to -- 37 --.

Signed and Sealed this

Twenty-fifth Day of April, 2006

JON W. DUDAS
*Director of the United States Patent and Trademark Office*